May 16, 1933.    N. B. ORNITZ    1,909,500
SHAFT MOUNTING FOR ROLLERS OR PULLEYS
Filed May 19, 1930    2 Sheets-Sheet 1

INVENTOR
Nathaniel B Ornitz
by Byrnes, Stebbins, Parmelee & Blenko
his Attorneys

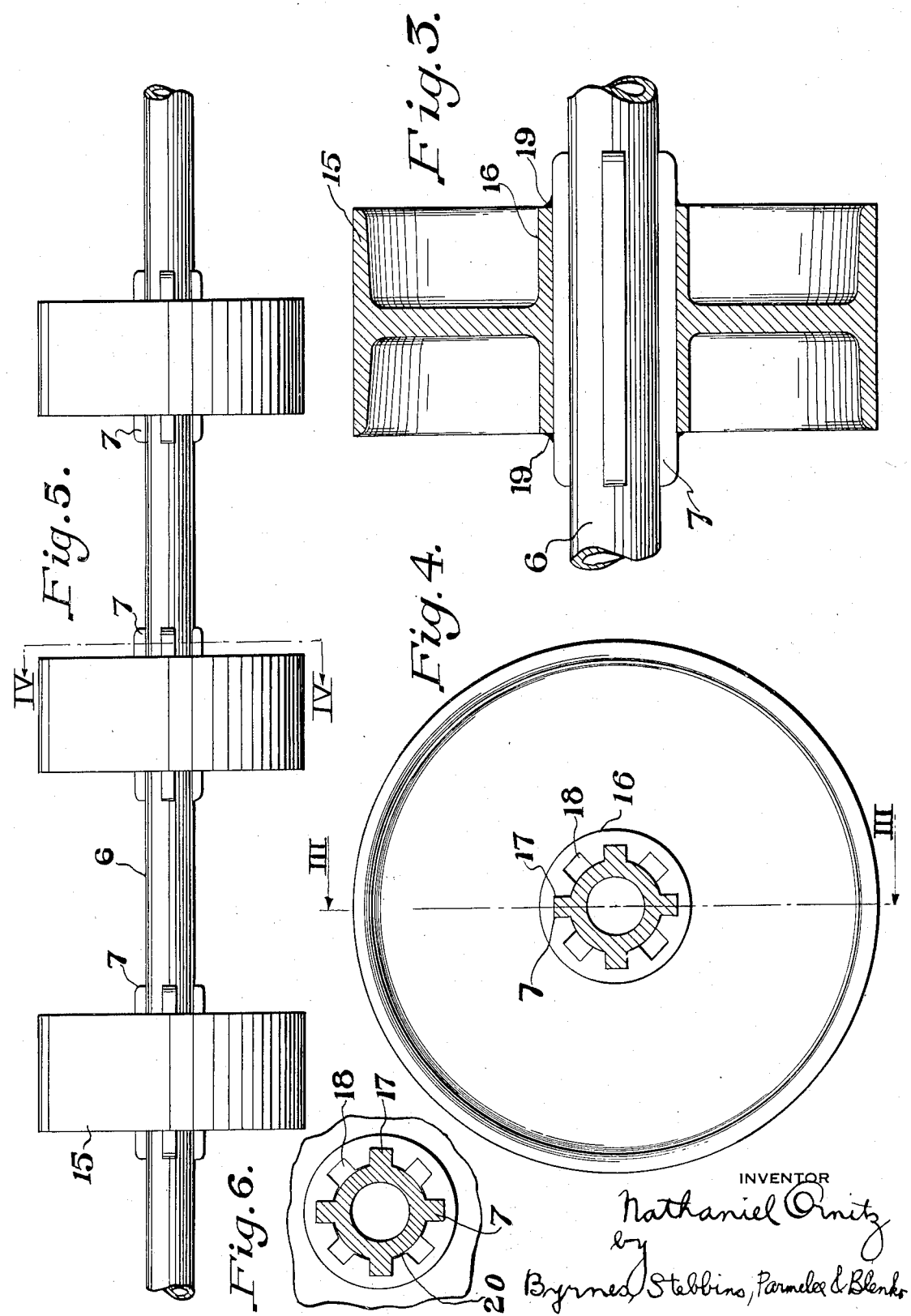

Patented May 16, 1933

1,909,500

UNITED STATES PATENT OFFICE

NATHANIEL B. ORNITZ, OF PITTSBURGH, PENNSYLVANIA, ASSIGNOR TO NATIONAL ALLOY STEEL COMPANY, OF BLAWNOX, PENNSYLVANIA, A CORPORATION OF PENNSYLVANIA

SHAFT MOUNTING FOR ROLLERS OR PULLEYS

Application filed May 19, 1930. Serial No. 453,481.

This invention relates to a mounting whereby a plurality of rotatable elements are connected for simultaneous rotation. More specifically, my invention relates to a mounting for a rotor on a shaft. In particular, my invention relates to the securing means connecting spaced rollers to the shaft on which they are mounted, this combination being employed in a continuous normalizing, annealing, or heating furnace.

An object of my invention is to provide an improved mounting for connecting rotatable elements for simultaneous rotation.

A further object of my invention is to provide an improved mounting for a rotor on a shaft or the like.

A still further object of my invention is to provide connecting means for a shaft and a plurality of rotors whereby an intermediate rotor may be moved longitudinally of the shaft, and when adjacent its position, moved into engagement with suitable securing means.

If rollers or the like intended for use at high temperatures could be fabricated and operated and maintained at some specific high temperature and at no time subjected to greater temperature fluctuation than is encountered under atmospheric conditions, the problems involved in design would be no more difficult than in ordinary engineering practice under normal conditions. Because of the high temperatures normally occurring in a continuous normalizing, annealing or heating furnace, the shafts, rollers or the like are generally fabricated of a suitable alloy. Stresses (compressive, tensile or shear) due to unequal temperature distribution and non-uniform temperature gradients, cause more failures in high temperature alloy equipment than all other influences combined. In high temperature engineering, dimensional variations are up to fifty times as great as those encountered in ordinary structural engineering. Most failures in service from these causes are due to thermal expansion stresses which exceed the elastic limit, thus producing plastically deformed areas under either tension or compression which are then "set" for the highest temperature of a given operation cycle but again caused to flow (or perhaps fail) under reversed stresses when the temperature is lowered.

In maintaining a rotor such as a roller, pulley or gear on a shaft or the like, the fit must always be taken into consideration. In such apparatus as is used in a continuous normalizing, annealing or heating furnace, the problem of clearances is an exceedingly difficult one. The construction must be sufficiently rugged to stand the ordinary usage; and yet the flexibility of the connections between various members must be promoted as much as possible for the reasons above pointed out. In limiting the contact between the rotor, such as a roller, and the shaft on which it is mounted to the interengaging portions which lock one to the other, the strength of the structure is maintained, and the opportunity is given for elastic deformation of the members to take care of expansion and contraction under temperature variations.

In mounting a plurality of rotors on a shaft, means projecting from the shaft may be provided for connecting to the shaft the plurality of rotors. This presents a different problem from the situation where but one rotor is to be secured to the shaft since, in this case, a slot may be so formed as to fit the projection. Where a plurality of rotors, however, are involved, an intermediate rotor must have an opening of sufficient cross section to permit the rotor to move past the first projection so that it can be properly positioned at a suitable location on the shaft. Difficulty has been encountered, however, either due to the fact that the rotor would not move easily past the first projection or due to the fact that the opening was too large to permit the rotor to be secured firmly to the shaft. In my improved mechanism, this difficulty is overcome by providing separate openings, one permitting the rotor to pass the first projection and another for engaging the projection which is to secure said rotor to the shaft.

In the accompanying drawings in which there are shown for purposes of illustration and not as limiting my invention, two embodiments of the same, Fig. 1 is a view partly in central axial section, and partly in elevation, of a roller mounted on a shaft in accordance with one embodiment of my invention;

Fig. 3 is a view principally in section on line III—III of Fig. 4, the shaft being shown in elevation;

Fig. 4 is a sectional view on line IV—IV of Fig. 5;

Fig. 5 is a view on a smaller scale of a shaft on which are mounted a plurality of rotors; and Fig. 6 is a fragmentary view of a hub which is a modification of the one shown in Figs. 3 and 4.

In accordance with the first embodiment of my invention, I provide a shaft having projections grouped together at one portion of the shaft and spaced angularly around the shaft. The number of projections is obviously not important, as long as they afford sufficient interlock. The roller is provided with inwardly projecting portions which engage only the projections and not the body of the shaft. The roller is to be assembled with the shaft by passing the shaft through an opening in the center of the roller; and it is obviously desirable to leave an open central space unobstructed by portions of the roller, this central space being larger in cross section than the prevailing cross section of the shaft. By "prevailing cross section of the shaft" is meant the size of an opening which would be necessary to let the shaft, aside from the projections, pass through the same.

Figure 1:
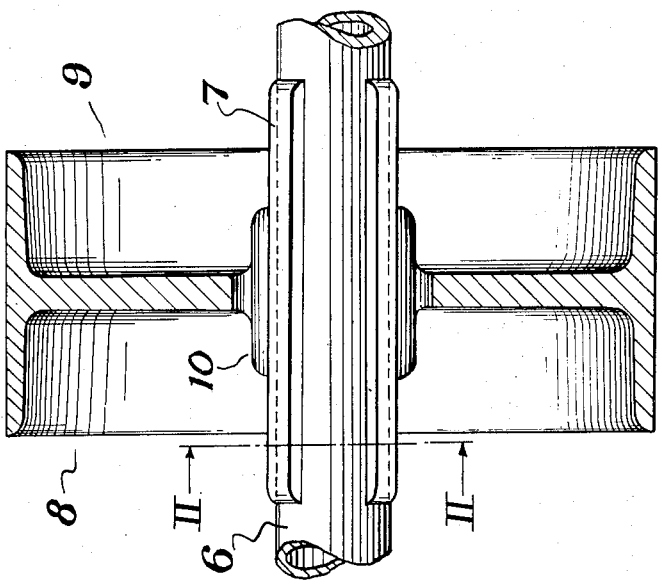
Figure 2:
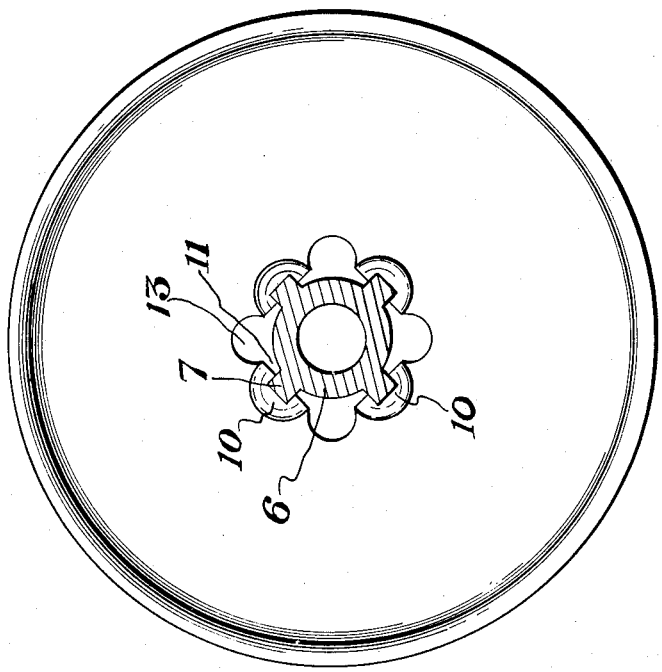
Fig. 2 is a transverse sectional view on line II—II of Fig. 1.

Referring to Figure 1 of the drawings, I provide a shaft 6 formed with a plurality of projections 7. These projections may take the form of longitudinal ribs spaced 90° apart above the shaft. The roller 8 is provided with a web 9 arranged in a plane transverse to the shaft 6. The web 9 extends inwardly, but terminates short of the shaft 6. A plurality of feet 10 project inwardly from the web 9. These feet 10 correspond in number to the projections 7; and are slotted to fit the projections 7. It will be noted that they do not extend into engagement with the body of the shaft 6, a space 11 being left between each foot 10 and the body of the shaft 6. The open space bounded by the innermost portions of the feet 10 is therefore large enough to permit the shaft 6 to pass through, and accordingly the cross-section of this central space is larger than the prevailing cross-section of the shaft 6. Between the feet 10 are openings 13 which may be of any shape and dimensions desired to facilitate the elastic deformation of the web 9 as the temperature varies.

In Figs. 3 to 6 inclusive there is shown an embodiment of my invention in which a plurality of rotors 15 are shown mounted on a shaft 6. A plurality of ribs 7 are provided for each rotor. The prevailing cross-section of the shaft, aside from these ribs 7, is less than the unobstructed central space which is left in each one of the rollers 15.

Any number of rotors may be provided. In the embodiment disclosed herein rollers 15, suitable for supporting sheets, plates or the like, when being passed through a continuous normalizing, annealing or heating furnace, are mounted on the shaft 6. A plurality of these rollers 15 are mounted on the shaft 6 in spaced relation, but a portion of this shaft being shown in Fig. 5. In such a furnace or heating chamber, the metal being treated or heated is subjected to a high temperature, and in certain instances a temperature of 2000° F. may be maintained within the chamber in which the rollers 15 are employed. Accordingly, it is desirable that securing means be employed which are not easily sheared off. The embodiment of my invention, which is disclosed in the drawings, is therefore particularly adapted for this purpose. It is to be understood, however, that my invention is broadly applicable to the art of mounting rotors upon a shaft It is moreover clearly apparent that it is immaterial whether the rotors are to be driven by the shaft or whether the rotors are to drive the shaft. As an instance of the latter, a plurality of gears might be mounted on a shaft and secured thereto in accordance with the teaching of my invention as set forth herein.

The hub 16 of the rotor is provided with a plurality (herein four) of slots 17 which are of suitable cross section to fit the projections 7. The fit may permit one to slide freely relative to the other, or the fit may be a tight fit so as to require considerable force to move one relative to the other.

It will furthermore be noted from Fig. 4 that a second set of slots 18 is formed in the hub 16. The number of these slots 18 is the same as the number of the slots 11. The slots 18 are made of slightly larger cross section than the slots 17 so as to ensure that the projections 7 may pass freely through the same. Due to the ample space left in the center of the hubs 16 this space, as above mentioned, being larger in cross-section than the prevailing cross section of the shaft 6, the rollers 15 may be moved freely along the shaft 6 when not in engagement with the ribs 7.

When the roller 15 has been moved into desired position, the same may be secured thereby by spot welding at the ends of the slots 17 as indicated at 19 in Fig. 3.

The method of assembling the members is now clearly apparent. A roller 15 is moved longitudinally of the shaft 6. During such longitudinal movement the roller 15 is so arranged that the slots 18 permit the projection 7 to pass through the same. When the roller 15 has been brought adjacent the desired location on the shaft 6, the roller 15 is turned so that the slots 17 register with the projections 7. The roller 15 is then moved relative to the shaft, the projections 7 engaging in the slots 17. By spot welding, the roller is secured in its desired location.

The projections 7 will, of themselves, support the rollers where the fit is snug; and in such case the opening in the hub 16 may be larger than the cross section of the shaft 6, thereby leaving a space, as is shown at 20 in Fig. 6. This provides certain advantages, since the shaft may increase in diameter due to heating, or it may become roughened in service so as to make it difficult to slide a roller over the same. Moreover, a roller, when formed with the larger opening, can be used either with the shaft shown in the drawings, or a slightly larger shaft.

It will be noted that, although projections are provided at spaced points along the shaft 6, the movement of a roller 15 along the shaft is not interfered with. At the same time my improved mechanism provides the advantage of securing one member to the other without danger of shearing off the interengaging portions of the members.

While I have described in detail the preferred embodiment of my invention, and a suitable method for assembling the parts thereof, it is to be understood that the invention is not so limited, but it may be otherwise embodied in the scope of the following claims.

I claim:

1. Rotatable mechanism comprising a member having a cylindrical surface and a plurality of projections spaced longitudinally along said member and extending therefrom, and a second member having a bore adapted to receive the first member, said bore being a free sliding fit for the cylindrical surface of the first member, the second member having a slot for permitting a projection from the first member to pass freely therethrough and a second slot for receiving and tightly fitting a second of said projections, said second projection being spaced longitudinally from the first projection.

2. Rotatable mechanism comprising a shaft having a plurality of projections spaced longitudinally along said shaft and extending therefrom, and a member having a bore adapted to receive the shaft, a slot extending outwardly from the bore of suitable cross section to permit a projection from the shaft to pass therethrough and a second slot of suitable cross section to fit a second of said projections, said second projection being spaced longitudinally from the first projection.

3. Rotatable mechanism comprising a shaft having a plurality of projections spaced longitudinally along said shaft and extending therefrom, and a plurality of members mounted on said shaft, one of said members having a slot of suitable cross section to permit a projection from the shaft to pass therethrough and a second slot of suitable cross section to fit a second of said projections spaced longitudinally from the first projection, and another of said members having a slot of suitable cross section to fit said first mentioned projection.

4. The combination with a furnace roll shaft having a plurality of keys disposed axially thereon, of a plurality of rolls having slots for receiving said keys whereby the rolls are rigidly secured to the shaft, said rolls also having slots larger than said keys to facilitate axial movement of the rolls along the shaft.

5. A roll conveyor comprising a shaft and rolls spaced along the length thereof, said shaft having axially alined, spaced keys formed integral therewith, said rolls having a recess tightly fitting over said keys and a recess larger than the keys.

6. A conveyor unit comprising a shaft, a plurality of rolls carried thereby, said shaft having spaced projections on its surface, and said rolls having shaft receiving openings provided with slots fitting said projections tightly and loosely, respectively.

7. In a roll shaft, a plurality of spaced lugs, and rolls having recesses fitting said lugs loosely and tightly whereby axial movement of the rolls on the shaft and rigid mounting of the rolls on the shaft are facilitated.

8. In combination, a shaft having spaced projecting lugs, and discs adapted to be mounted on said shaft, said discs having shaft receiving openings provided with loosely and tightly fitting recesses for receiving said lugs.

9. The combination with a roll shaft having spaced lugs on the surface thereof, of rolls having shaft receiving openings, and separate slots formed in said openings for tightly and loosely receiving said lugs, respectively.

10. Means for securing discs to a shaft comprising lugs on the shaft and recesses in a shaft receiving opening in said discs, one of said recesses fitting said lugs loosely and another fitting the lugs tightly.

11. Rotatable mechanism comprising a shaft having a plurality of projections grouped together at one portion of the shaft and spaced angularly about the shaft, and a rotor having an open central space larger in cross-section than the prevailing cross-section of the shaft, said rotor having portions interengaging with the projections on the shaft and affording sufficient clearance for the body of the shaft to permit the rotor to be moved along the shaft, said rotor being mounted on the shaft solely by said interengaging portions.

12. Rotatable mechanism comprising a shaft having a plurality of projections spaced angularly about the shaft, and a roller having an open central space larger in cross-section than the prevailing cross-section of the shaft, said roller having slotted portions for receiving the projections on the shaft, said slotted portions affording sufficient clearance for the body of the shaft to permit the roller to be moved along the shaft, said roller being mounted on the shaft solely by the interengagement of said slotted portions with said projections.

13. In combination, a shaft, a roller, and means for mounting the roller on the shaft comprising a plurality of projections on the shaft spaced angularly about the shaft and a like number of feet on the roller, each foot extending inwardly and having a slot for receiving within the foot the corresponding projection, each foot being separated from adjacent feet by a space of dimensions greater than those of the slot in said foot.

14. Rotatable mechanism comprising a shaft having a plurality of projections spaced angularly about the shaft, a roller having slotted portions for receiving the projections on the shaft, both the projections and the slots having uniform top and side surfaces, both the top and side surfaces of a projection tightly fitting the top and side surfaces of the corresponding slot in a plurality of different positions of the roller along the projections, said roller being mounted on said shaft solely by said tightly fitting surfaces, and securing means for fixing the roller at the selected position on the shaft.

15. A roller and shaft for use under high temperature conditions in a heating furnace comprising a shaft fabricated of heat-resisting alloy and having a plurality of projections grouped together at one portion of the shaft and spaced angularly about the shaft, and a roller of heat-resisting alloy, said roller having an open central space larger in cross-section than the prevailing cross-section of the shaft, said roller having portions interengaging with the projections on the shaft and affording sufficient clearance for the body of the shaft to permit the roller to be moved along the shaft, said roller being mounted on the shaft solely by said interengaging portions.

16. A roller and shaft for use under high temperature conditions in a heating furnace comprising a shaft fabricated of heat-resisting alloy and having a group of projections spaced angularly about the shaft, and a roller of heat-resisting alloy, said roller having a plurality of feet, each foot extending inwardly and having a slot for receiving within the foot the corresponding projection, each foot being separated from adjacent feet by a space of dimensions greater than those of the slot in said foot.

17. Rotatable mechanism comprising a shaft having a plurality of projections spaced angularly about the shaft, and a roller having slotted portions for receiving the projections on the shaft, both the projections and the slots having uniform top and side surfaces, both the top and side surfaces of a projection tightly fitting the top and side surfaces of the corresponding slot in a plurality of different positions of the roller along the projections, said roller being mounted on said shaft solely by said tightly fitting surfaces.

In testimony whereof I have hereunto set my hand.

NATHANIEL B. ORNITZ.